United States Patent [19]

Tada et al.

[11] Patent Number: 4,769,282
[45] Date of Patent: Sep. 6, 1988

[54] MAGNETIC RECORDING MEDIUM

[75] Inventors: Junya Tada, Ichikawa; Tomohisa Watanabe, Kakura; Makoto Akihiro; Kouichi Oka, both of Ichikawa; Takehiko Sato, Musashino, all of Japan

[73] Assignee: Sumitomo Metal Mining Co., Ltd., Tokyo, Japan

[21] Appl. No.: 27,227

[22] PCT Filed: Jun. 20, 1986

[86] PCT No.: PCT/JP86/00312

§ 371 Date: Feb. 20, 1987

§ 102(e) Date: Feb. 20, 1987

[87] PCT Pub. No.: WO86/07651

PCT Pub. Date: Dec. 31, 1986

[30] Foreign Application Priority Data

Jun. 21, 1985 [JP] Japan ............... 60-135410
Jun. 28, 1985 [JP] Japan ............... 60-142189
Dec. 16, 1985 [JP] Japan ............... 60-281168
Dec. 25, 1985 [JP] Japan ............... 60-290856
Mar. 31, 1986 [JP] Japan ............... 61-70882

[51] Int. Cl.[4] ............................. H01F 10/16
[52] U.S. Cl. .................... 428/336; 428/457; 428/694; 428/702; 428/900
[58] Field of Search ............... 428/694, 702, 900, 457, 428/336

[56] References Cited

U.S. PATENT DOCUMENTS

| | | | |
|---|---|---|---|
| 4,323,629 | 4/1982 | Kunieda et al. | 427/132 |
| 4,511,635 | 4/1985 | Nagao et al. | 428/694 |
| 4,592,948 | 6/1986 | Kohomoto et al. | 428/695 |
| 4,661,418 | 4/1987 | Yanai et al. | 428/610 |

FOREIGN PATENT DOCUMENTS

| | | |
|---|---|---|
| 198615 | 12/1982 | Japan . |
| 16512 | 1/1983 | Japan . |
| 113340 | 7/1983 | Japan . |
| 116707 | 7/1983 | Japan . |
| 165306 | 9/1983 | Japan . |
| 189349 | 11/1983 | Japan . |
| 204146 | 11/1983 | Japan . |
| 212116 | 12/1983 | Japan . |
| 48904 | 3/1984 | Japan . |

Primary Examiner—George F. Lesmes
Assistant Examiner—William M. Atkinson
Attorney, Agent, or Firm—Watson, Cole, Grindle & Watson

[57] ABSTRACT

A magnetic recording medium comprising a non-magnetic substrate and a magnetic layer formed on the substrate, in which the magnetic layer comprises 1-8% metal element M consisting of one or more of B, Al, Si, P, Ge, Sn, Sb, Se, Te, Pb, Bi, Cu, Ti, V, Cr, Zr, Nb, Mo, W and Ta, less than 13% by weight of one or more of rare earth elements of Y, La, Ce, Pr, Nd, Sm, Gd, Tb, or Dy, 3-13% by weight of oxygen, balance of Co and inevitable impurities. The magnetic layer may contain less than 22% by weight of Ni. The magnetic recording medium has a favorable corrosion resistance and excellent magnetic properties.

10 Claims, 7 Drawing Sheets

MAGNETIC RECORDING MEDIUM

DESCRIPTION

1. Technical Field

This invention concerns a magnetic recording medium and, particularly, a Co—Ni series magnetic recording film which includes specific rare earth elements that improve its magnetic properties and its corrosion resistance.

2. The Prior Art

Magnetic recording media are normally formed kneading magnetic powder, such as of $\gamma$—$Fe_2O_3$ or Fe, with a synthetic resin binder and then coating the product on a non-magnetizable substrate.

A magnetic recording medium capable of higher density recording than the coated-type magnetic recording medium has been also developed in which a thin metal magnetic film is formed on a substrate. Methods of forming the thin metal magnetic film on a substrate include:

(a) a chemical plating method, this being wet process, and (b) a sputtering method, an ion plating method or a vacuum evaporation method, these being dry processes.

It has generally been considered that a dry process, (b), can provide a favorable magnetic recording medium as compared with the wet process, (a), in view of the primary treatment applied to the substrate and the homogeneity of the magnetic layer in the longitudinal direction and the lateral direction.

However, the thin metal film type magnetic recording medium formed by the dry process has a much lower thermohydrodynamic stability and more pores as compared with oxide magnetic powder, and it tends to be readily corroded in air, thus causing a reduction in its performance.

Many attempts have been made to improve the corrosion resistance without reducing the magnetic properties of the magnetic recording medium. For example, it has been disclosed in Japanese Patent Laid Open No. Sho 56-15014, No. Sho 57-196507 No. Sho 58-134414 to improve the corrosion resistance of a magnetic recording medium by either incorporating metal additives, supplying a gas mixture of ozone and oxygen to the magnetic layer-forming portion, or quantitatively setting the content of oxygen atoms incorporated in the magnetic layer.

However, only a slight improvement in the corrosion resistance is achieved by any of the foregoing treatments, and the saturation magnetization or the residual magnetization is descreased depending on the treatment resulting in the reduction in the reproduced signal level of the magnetic recording medium.

The object of this invention is to overcome the foregoing drawbacks in the conventional magnetic recording media and to provide those with improved magnetic properties and corrosion resistance by adding specific rare earth elements to the magnetic recording media of Co—Ni series of metal film type.

SUMMARY OF THE INVENTION

In this invention, a magnetic layer comprising Ni, metal element M, rare earth element R, oxygen and Co is formed on a non-magnetic substrate, the metal element M consisting of one or more of B, Al, Si, P, Ge, Sn, Sb, Se, Te, Pb, Bi, Cu, Ti, V, Cr, Zr, Nb, Mo, W and Ta, and the rare earth element R consisting of one or more of Y, La, Ce, Pr, Nd, Sm, Gd, Tb and Dy, in which the composition of the magnetic layer comprises, on weight basis, 0–22% Ni, 1–8% metal element M, less than 13% rare earth element R, 3–13% oxygen, the balance of Co and inevitable impurities.

This invention will further be explained below starting with an explanation of why the composition of the magnetic layer formed on the non-magnetizable substrate is limited as noted above.

Ni basically has a tendency of reducing the residual magnetization of the magnetic recording medium and has an effect of improving the corrosion resistance of the magnetic layer of metal mainly composed of Co. If it is contained in excess of 22% by weight, the residual magnetization of the magnetic layer is remarkably reduced, thus lowering the reproduced signal level.

The metal element M consisting one or more of B, Al, Si, P, Ge, Sn, Sb, Se, Te, Pb, Bi, Cu, Ti, V, Cr, Zr, Nb, Mo, W and Ta is incorporated in order to stabilize and improve the corrosion resistance of the Co—Ni series metal magnetic layer. If it is less than 1% by weight, no effect is recognized. While on the other hand, if it is contained in excess of 8% by weight, the residual magnetization of the magnetic recording medium is decreased.

The rare earth element R consisting one or more of Y, La, Ce, Pr, Nd, Sm, Gd, Td, and Dy is incorporated in order to improve the magnetic properties and the corrosion resistance of the Co—Ni series metal magnetic layer. If it is added in excess of 13% by weight, the coercive force and the saturation magnetization are decreased and the corrosion resistance is reduced as well.

Oxygen is contained in the magnetic recording medium to improve the coercive force of the magnetic recording medium by partially chemically reacting it with the metal to form a metal oxide thin layer and causing the other portion to be adsorbed in the magnetic layer of the magnetic recording medium. If it is less than 3% by weight, no effect is recognized, the coercive force of the magnetic recording medium is not improved and the corrosion resistance is reduced. On the other hand, if it is contained in excess of 13% by weight, a significant effect of oxidization appears and the ratio of metal oxide is increased, thereby failing to obtain sufficient corrosion resistance and the saturation magnetization Ms is reduced.

For obtaining the magnetic layer of the above-mentioned composition, one of C, S, Zn, and Fe, may be contained inevitably in the purifying and alloying steps of starting material. However, if these inevitable impurities are contained by more than 1% by weight, the magnetic properties are reduced.

The thickness of the magnetic layer of the composition according to this invention as described above is desirably about from 0.1 $\mu$m to 1.0 $\mu$m. If it is less than 0.1 $\mu$m, no sufficient reproduced signal level is obtained, whereas if the thickness exceeds 1.0 $\mu$m, the flexibility of the film is decreased and furthermore, it is difficult to increase the recording density.

As the non-magnetic substrate on which such a magnetic layer is formed, plastic films having appropriate flexibility and stretch resistance and heat resistance upon vapor deposition may be used, for example, films made of polyester, acetate, polycarbonate and polyimide with a thickness of 5-25 $\mu$m, as well as a glass substrate and a metal substrate such as of Al as a disc-like substrate.

The method of preparing a magnetic recording medium according to this invention will be now discussed. Since the magnetic layer to be formed demands a high coercive force and a high saturation magnetic flux density due to the requirement for high density recording, it is desirable to employ a dry process, such as sputtering or ion plating.

In the dry process, it is possible to improve the coercive force by evaporating the composite atoms to the substrate at oblique incidence. When the composite atoms are evaporated to the substrate at oblique incidence, an acicular grain-grows obliquely to the substrate. In such a state, the magnetocrystalline anisotropy and the shape magnetic anisotropy is the main origin for the magnetic anisotropic properties and the coercive force of the magnetic recording medium is improved by the increase in the magnetic anisotropy. Further, the dry process is excellent for the reproducibility of the magnetic properties and also has an advantage in view of the manufacture in that a layer uniform in the longitudinal direction and the lateral direction can be manufactured with ease.

It is desirable to apply a primary treatment such as a corona discharging treatment or a primer treatment to the non-magnetic substrate before the evaporation in order to improve the adhesiveness with the magnetic layer.

A further understanding of the invention will be had by the following examples, considered in conjunction with the accompanying drawings.

DETAILED DESCRIPTION

Figure 1:
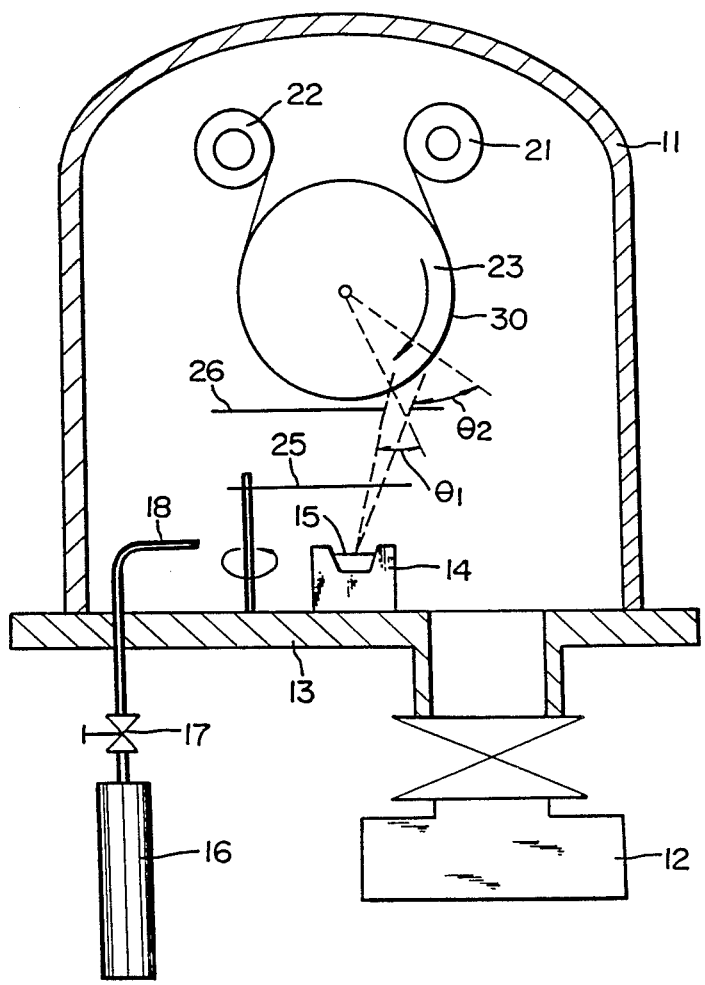
FIG. 1 is a cross sectional view showing the constitution for a main portion of a device for manufacturing a magnetic recording medium according to this invention.

FIG. 1 shows the cross sectional structure of an embodiment of a manufacturing device for the magnetic recording medium according to this invention, in which vacuum deposition chamber 11 substantially of a bell-like shape is formed. The vacuum deposition chamber 11 is connected with vacuum pump 12 and adapted such that the inside of the vacuum deposition chamber 11 can be set to a predetermined vacuum degree by driving the vacuum pump 12.

Electron beam evaporization source 14 is disposed on the bottom plate 13 of the vacuum deposition chamber 11, and ferromagnetic metal 15 is disposed within the electron beam evaporization source 14. The ferromagnetic metal 15 is mainly composed of Co, Ni and, further, one or more of metal element M from B, Al, Si, P, Ge, Sn, Sb, Se, Te, Pb, Bi, Cu, Ti, V, Cr, Zr, Nb, Mo, W and Ta, and rare-earth element R from Y, La, Ce, Pr, Nd, Sm, Gd, Tb and Dy and the composition of ingot is set so as to provide a predetermined composition of the film.

While on the other hand, introduction pipe 18 is led out from oxygen cylinder 16 by way of variable leak valve 17 and the end of the introduction pipe 18 is inserted through the bottom 13 to the inside of the vacuum deposition chamber 11. Unwinder 21 and winder 22 are rotatably disposed in the vacuum deposition chamber 11 and can 23 is rotatably disposed between the unwinder 21 and the winder 22.

Shutter 25 is disposed between the electron beam evaporization source 14 and the can 23. The shutter 25 is rotatable and opened only upon film forming. The maximum incident angle $\theta_2$ and the minimum incident angle $\theta_1$ of the evaporated matters to the substrate can be adjusted by shutter member 26.

Non-magnetic substrate 30 is wound around the unwinder 21, the end of the non-magnetic substrate 30 is let out and taken-up by way of the can 23 around the winder 22.

As the non-magnetic substrate on which such a magnetic layer is formed, there may be used those plastic films having appropriate flexibility and stretch resistance and heat resistance upon vapor deposition, for example, made of polyester, acetate, polycarbonate and polyimide with a thickness of 5-25 $\mu$m, as well as glass substrate and metal substrate such as of Al as a disc-like substrate.

A polyester film of 12 $\mu$m thickness was used as the non-magnetic substrate 30.

The unwinder 21 and the winder 22 are driven and the non-magnetic substrate 30 is sent in contact with the circumferential surface of the can 23 at a speed, for example, of 15 m/min. The vacuum pump 12 is driven to evacuate the inside of the vacuum deposition chamber 11 to less than $5 \times 10^{-6}$ torr thereby evaporating the ferromagnetic metal 15 in the electron beam evaporization source 14 at a predetermined speed. At the same time, ON-OFF cock 17 is opened to release oxygen gas from the introduction pipe 18 to the inside of the vacuum deposition chamber 11. The supply of the oxygen gas to the inside of the vacuum deposition chamber 11 is also set such that a predetermined oxygen composition in the film is obtained.

By the opening of the shutter 25, in the ferromagnetic metal 15 released from the electron beam evaporization source 14, only the portion evaporated at oblique incidence within a predetermined range of angle relative to the non-magnetic substrate 30 passes through the shutter 26 and reaches the non-magnetic substrate 30.

That is, among the ferromagnetic metal 15 released from the electron beam evaporization source 14, only the portion within the range of angle from the minimum angle $\theta_1$ to the maximum angle $\theta_2$ as shown in FIG. 1 relative to the normal line to the non-magnetic substrate 30 passes through the shutter 26 and enters obliquely relative to the non-magnetic substrate 30. In this way, a magnetic layer of 0.2 $\mu$m thickness was formed.

The thus obtained magnetic recording media were cut and served for the analysis of the composition and the evaluation for the magnetic properties and the corrosion resistance respectively.

For the composition analysis, EPMA analysis and chemical analysis were used in combination, and the magnetic properties were measured by a vibrating sample magnetometer. Then, the evaluation of the corrosion resistance was conducted by maintaining the magnetic recording medium to be measured in an atmosphere prepared by a thermostable and humidity stable tank (temperature 50° C., humidity 90%) over a predetermined of corrosion time T, then taking out the medium from the temperature stable and humidity stable tank, irradiating laser beam to the magnetic recording medium, measuring the amount of light permeating through the magnetic recording medium and determining the transmittance thereof.

The results thus obtained are shown in FIGS. 2 through 11 and Table 1 (transmittance after 100 hours of corrosion time).

C, S, Zn and Fe, were analyzed as inevitable impurity elements other than Ni, R, and oxygen in the medium and the total amount therefor was less than 1% by weight.

TABLE 1

| Sample No. | Medium composition | | | | | Magnetic property | | Transmittance (%) | |
|---|---|---|---|---|---|---|---|---|---|
| | Co (wt %) | Ni (wt %) | M (wt %) | R (wt %) | O (wt %) | Saturation magnetization Ms(Gauss) | Coercive force Hc(Oe) | | |
| 1 | Balance | 20.7 | — | — | 6.3 | 960 | 650 | 5.0 | ** |
| 2 | " | 2.8 | Ti 3.1 | Pr 9.6 / Gd 1.5 | 6.5 | 980 | 800 | 2.0 | * |
| 3 | " | 14.8 | Cr 4.6 | Nd 1.4 / Dy 1.0 | 4.4 | 740 | 680 | 3.0 | * |
| 4 | " | 16.3 | Zr 2.8 | Sm 1.4 / Tb 1.1 | 4.6 | 630 | 770 | 3.0 | * |
| 5 | " | 4.3 | Nb 1.0 / Mo 0.5 | Pr 6.3 / Nd 2.6 | 5.8 | 890 | 740 | 3.0 | * |
| 6 | " | 4.7 | Cr 1.2 / Ta 0.6 | Gd 5.8 / Tb 3.8 | 5.9 | 880 | 835 | 3.0 | * |
| 7 | " | 11.6 | Nb 1.8 | Nd 0.4 / Gd 0.5 | 8.3 | 810 | 790 | 2.0 | * |
| 8 | " | 10.6 | Mo 6.3 / Ta 0.6 | Pr 1.4 / Dy 1.3 | 9.5 | 800 | 780 | 1.5 | * |
| 9 | " | 13.3 | Al 2.0 | Pr 4.5 | 4.2 | 940 | 820 | 3.0 | * |
| 10 | " | 14.6 | Sn 4.8 | La 0.2 / Ce 0.6 / Nd 1.4 | 4.6 | 710 | 650 | 3.0 | * |
| 11 | " | 5.8 | Ge 3.1 | Y 0.5 / Pr 7.6 | 6.5 | 930 | 830 | 3.5 | * |
| 12 | " | 12.6 | Si 2.2 / Cr 2.6 | Nd 1.5 / Dy 0.9 | 6.0 | 750 | 640 | 3.0 | * |
| 13 | " | 13.2 | Se 4.4 | Ce 1.4 / Tb 1.1 | 6.1 | 675 | 770 | 3.5 | * |
| 14 | " | 9.5 | Ge 1.0 / Nb 1.5 | Pr 4.1 / Nd 4.5 | 4.9 | 860 | 770 | 3.0 | * |
| 15 | " | 8.2 | Al 1.0 / Cr 0.8 | Y 3.2 / Gd 4.3 | 4.9 | 890 | 850 | 3.0 | * |
| 16 | " | — | Bi 0.4 / Cu 3.1 | Y 3.8 / La 2.0 | 5.9 | 980 | 720 | 3.5 | * |
| 17 | " | 12.2 | Ge 1.1 / Nb 0.9 | Nd 0.4 / Gd 0.5 | 8.5 | 805 | 780 | 2.0 | * |
| 18 | " | 4.9 | Cu 3.0 | Y 0.8 / Pr 8.6 | 6.2 | 940 | 840 | 3.0 | * |
| 19 | " | 14.6 | Cr 4.5 | La 0.4 / Ce 0.6 / Nd 1.4 | 4.6 | 740 | 670 | 3.5 | * |
| 20 | " | 16.3 | Cu 0.8 / Zr 2.0 | Ce 1.4 / Tb 1.1 | 4.6 | 650 | 760 | 3.5 | * |
| 21 | " | 9.5 | Cu 1.0 / Nb 1.5 | Pr 6.3 / Nd 1.4 | 5.8 | 860 | 750 | 3.0 | * |
| 22 | " | 5.2 | V 0.6 / Cr 1.2 | Y 3.7 / Gd 5.9 | 5.8 | 880 | 835 | 3.0 | * |
| 23 | " | — | Cu 3.5 | Y 3.0 / La 1.8 | 5.7 | 980 | 710 | 3.5 | * |
| 24 | " | 11.0 | Cu 2.0 | Nd 0.6 / Gd 0.3 / Pr 9.6 | 9.2 | 780 | 790 | 3.0 | * |

TABLE 1-continued

| Sample No. | Medium composition Co (wt %) | Ni (wt %) | M (wt %) | R (wt %) | O (wt %) | Magnetic property Saturation magnetization Ms(Gauss) | Coercive force Hc(Oe) | Transmittance (%) | |
|---|---|---|---|---|---|---|---|---|---|
| 25 | " | 2.8 | Cu 3.1 | Gd 1.5 | 6.5 | 980 | 810 | 3.5 | * |
| 26 | " | 14.9 | Cu 4.5 | Nd 1.2<br>Dy 1.2 | 4.4 | 740 | 690 | 3.0 | * |
| 27 | " | 16.3 | Cu 2.8 | Sm 1.4<br>Tb 1.2 | 4.5 | 680 | 740 | 3.0 | * |
| 28 | " | 4.5 | Cu 1.5 | Pr 6.3<br>Nd 2.6 | 5.8 | 945 | 730 | 2.5 | * |
| 29 | " | 4.7 | Cu 1.8 | Gd 5.8<br>Tb 3.8 | 5.9 | 870 | 850 | 2.5 | * |
| 30 | " | 10.8 | Si 1.2<br>Cr 2.2 | Nd 0.5<br>Dy 0.2 | 10.8 | 800 | 780 | 3.0 | * |
| 31 | " | 12.2 | Sn 2.3 | Tb 0.4 | 11.7 | 725 | 960 | 3.0 | * |
| 32 | " | 9.5 | Ge 1.0<br>Nb 1.1 | Pr 0.7<br>Nd 0.2 | 9.8 | 820 | 920 | 2.0 | * |
| 33 | " | 11.4 | Al 0.7<br>Cr 0.8 | Y 0.2<br>Gd 0.4 | 9.7 | 770 | 980 | 3.0 | * |
| 34 | " | — | B 0.4<br>Cu 1.4 | Sm 0.3<br>La 0.2 | 11.3 | 790 | 1020 | 3.5 | * |
| 35 | " | 13.3 | Se 1.2 | Nd 0.4 | 9.2 | 820 | 870 | 1.0 | * |
| 36 | " | 5.8 | Ge 2.1 | Y 0.5<br>Pr 0.3 | 12.0 | 770 | 810 | 2.5 | * |
| 37 | " | 15.2 | V 2.0 | Sm 3.8<br>Gd 1.3 | 2.3 | 910 | 275 | 6.0 | *** |
| 38 | " | 7.0 | Cr 4.2 | Tb 1.3<br>Dy 1.3 | 14.0 | 300 | 805 | 5.5 | *** |
| 39 | " | 6.1 | Ti 2.6 | Pr 13.2<br>Sm 2.4 | 6.5 | 750 | 250 | 6.0 | *** |
| 40 | " | 11.8 | Pb 4.4 | La 1.5<br>Sm 3.8 | 2.1 | 840 | 230 | 6.0 | *** |
| 41 | " | 7.4 | B 4.2 | La 0.6<br>Ce 0.4<br>Tb 1.4 | 14.0 | 300 | 805 | 5.5 | *** |
| 42 | " | 8.0 | Si 2.8 | La 2.4<br>Pr 11.1 | 6.5 | 750 | 260 | 7.0 | *** |
| 43 | " | 12.1 | Al 6.8<br>Ta 1.7 | Y 2.1 | 8.5 | 690 | 730 | 5.5 | *** |
| 44 | " | 14.8 | V 2.4 | La 1.5<br>Sm 3.8 | 2.1 | 905 | 280 | 6.5 | *** |
| 45 | " | 7.4 | Cu 1.8<br>Cr 2.4 | Tb 1.4<br>Dy 1.0 | 14.0 | 330 | 810 | 5.5 | *** |
| 46 | " | 6.1 | Ta 2.7 | La 2.4<br>Pr 13.2 | 6.5 | 700 | 270 | 6.0 | *** |
| 47 | " | 15.3 | Cu 2.0 | Sm 3.8<br>Gd 1.3 | 2.2 | 930 | 250 | 6.0 | *** |
| 48 | " | 7.1 | Cu 4.2 | Tb 1.3<br>Dy 1.2 | 14.1 | 300 | 800 | 5.5 | *** |
| 49 | " | 6.1 | Cu 2.6 | Pr 13.2<br>Sm 2.4 | 6.5 | 750 | 250 | 6.0 | *** |
| 50 | " | 13.7 | Bi 2.4<br>Zr 0.8 | La 0.1<br>Sm 0.1 | 2.4 | 960 | 320 | 6.0 | *** |
| 51 | " | 8.1 | P 0.8<br>Se 2.9 | La 0.7<br>Ce 0.1<br>Tb 0.1<br>Y 0.2 | 16.3 | 400 | 950 | 6.0 | *** |

TABLE 1-continued

| Sample No. | Co (wt %) | Ni (wt %) | M (wt %) | R (wt %) | O (wt %) | Saturation magnetization Ms(Gauss) | Coercive force Hc(Oe) | Transmittance (%) | |
|---|---|---|---|---|---|---|---|---|---|
| 52 | " | 16.0 | Ta 6.4 | Dy 0.5 | 9.1 | 620 | 540 | 6.5 | *** |
| 53 | " | 8.3 | B 2.3, V 7.1 | Tb 0.6 | 8.6 | 670 | 440 | 5.5 | *** |

*This invention
**Conventional example
***Comparative example

FIGS. 2 through 6 show the relationship between the exposure time T (hour) and the transmittance D (%) of the magnetic recording media having various types of compositions, in which the corrosion resistance of this invention measured by the inventors is compared with that of the comparative examples.

The transmittance D (%) of a laser beam through the magnetic recording media after the exposure in corrosive environment, indicated as the ordinate in FIGS. 2 through 6, is a measure of the corrosion resistance.

Figure 2:
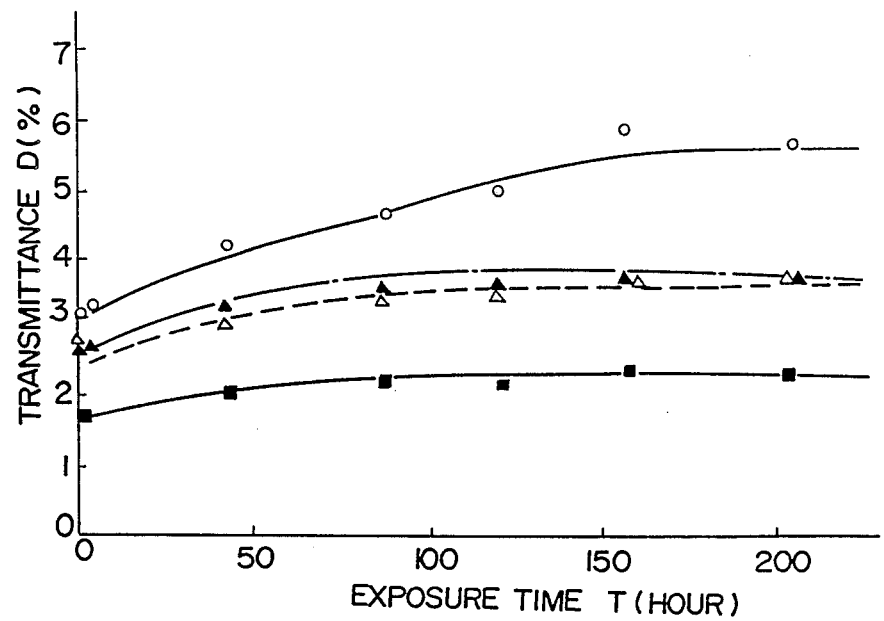
FIGS. 2 through 6 are views showing the corrosion resistance of magnetic recording media in the example of this invention and a conventional example.
Figure 6:
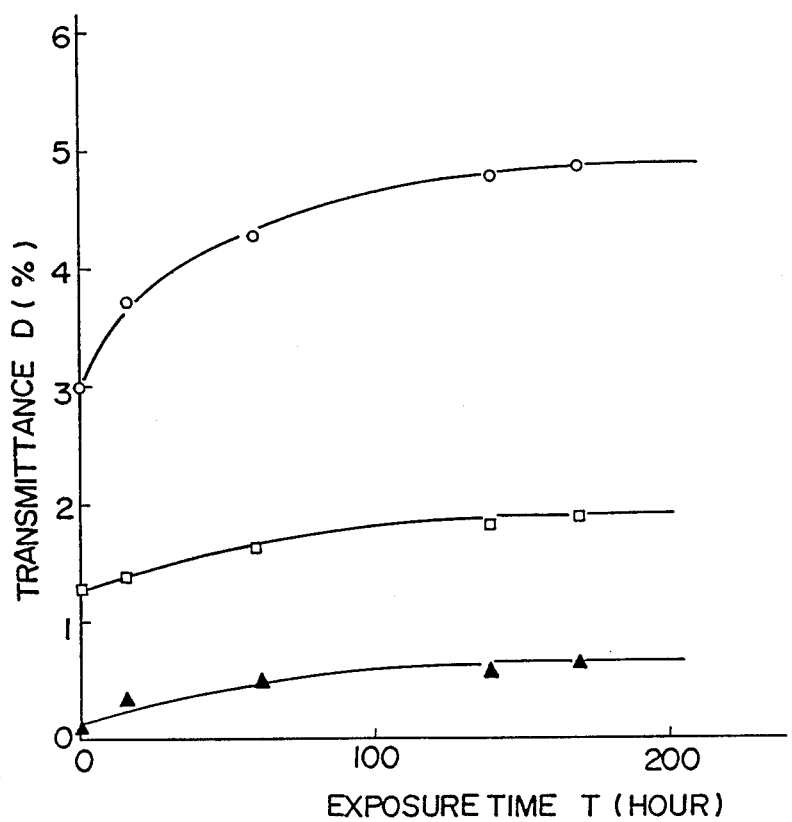

In FIGS. 2 and 6 the magnetic layers shown by the symbol O are comparative examples with a composition of 16.0 wt % Ni, 5.0 wt % O and the balance of Co (FIG. 2) and with a composition of 21.3 wt % Ni, 9.5 wt % O and the balance of Co (FIG. 6), not incorporated with the rare earth element R and the metal element M.

In the magnetic recording medium not incorporated with the rare earth element R and the metal element M the transmittance D is increased along with the increase in the exposure time T and the transmittance D is increased to about 6% if the exposure time exceeds 100 hours.

In the comparative example had a same tendency in FIG. 6, the transmittance D is increased to about 5% if the exposure time exceeds 100 hours.

Figure 3:
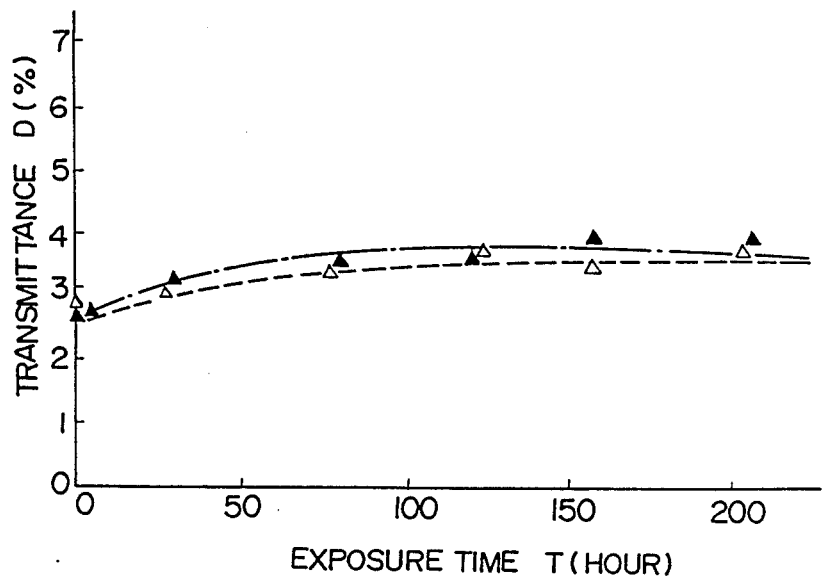
Figure 4:
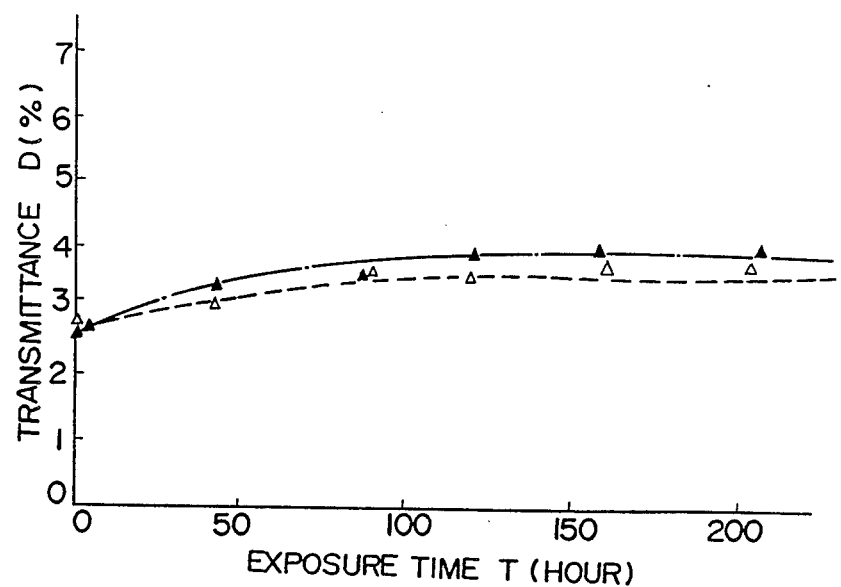
Figure 5:
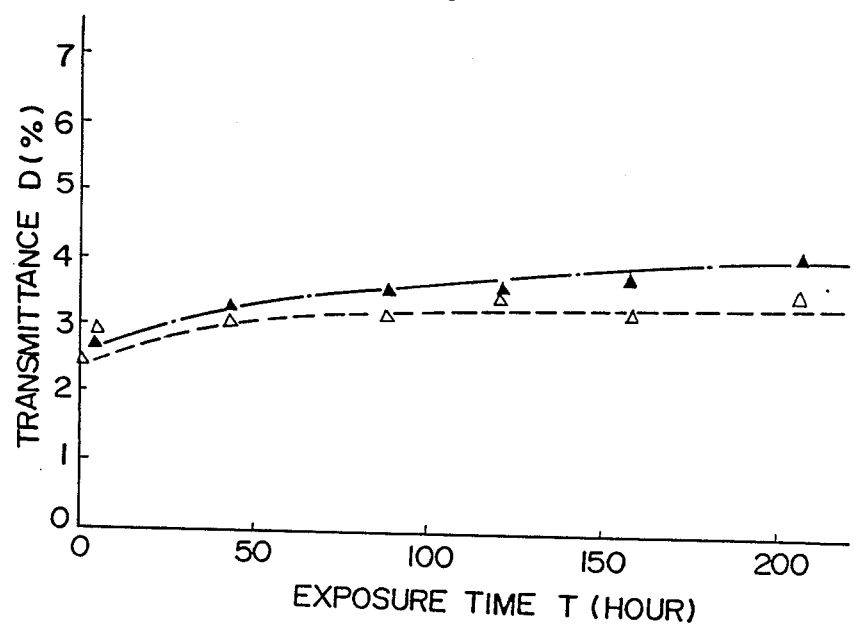

On the other hand, the magnetic recording media of this invention, that is, the samples shown by the symbol , Δ and  in FIG. 2 correspond to samples No. 3, 5 and 7, respectively, the samples shown by the symbol  and Δ in FIG. 3 correspond to samples No. 10 and 14, respectively, the samples shown by the symbol  and Δ in FIG. 4 correspond to samples No. 19 and 21, respectively, the samples shown by the symbol  and Δ in FIG. 5 correspond to samples No. 26 and 28, respectively, and the samples shown by the symbol □ and  in FIG. 6 correspond to samples No. 32 and 35, respectively, in Table 1, show very little increase in the transmittance D, about 1-3%, even after the elapse of about 50 hours of exposure time thus having excellent corrosion resistance as compared with the magnetic recording not containing the rare earth element R and the metal element M.

The results obtained by varying the content Rc of the rare earth element R and examining the effect on the coercive force Hc for the magnetic recording media in Table 2 described below are shown in FIGS. 7 through 11.

As apparent from FIGS. 7-11, although excellent coercive force Hc is provided if the rare earth element R is added by less than 13 wt %, the coercive force is remarkably reduced if it exceeds 13 wt %.

Figure 7:
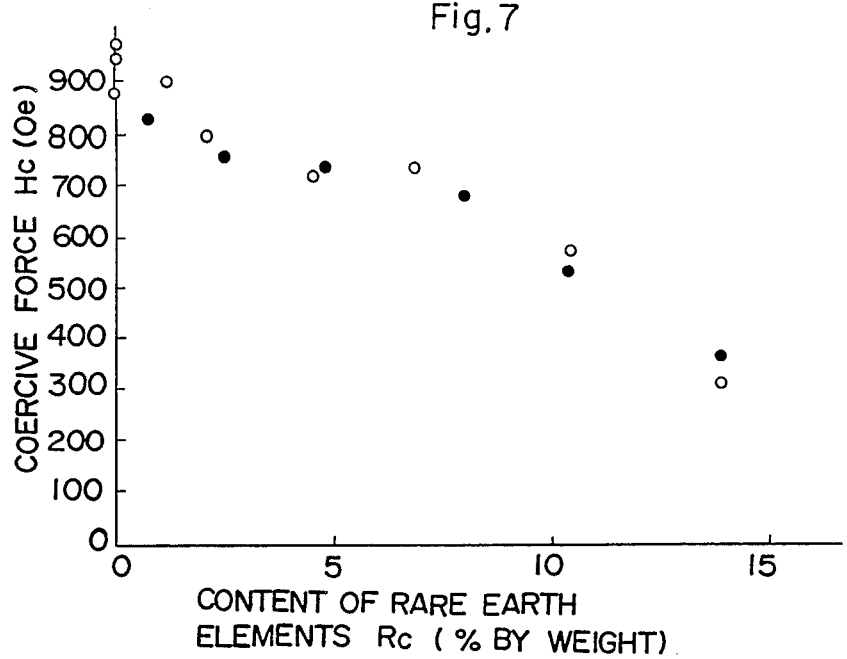
FIGS. 7 through 11 are views showing the relationship between the content Rc of rare earth element and the coercive force Hc in the magnetic recording media of various compositions.
Figure 8:
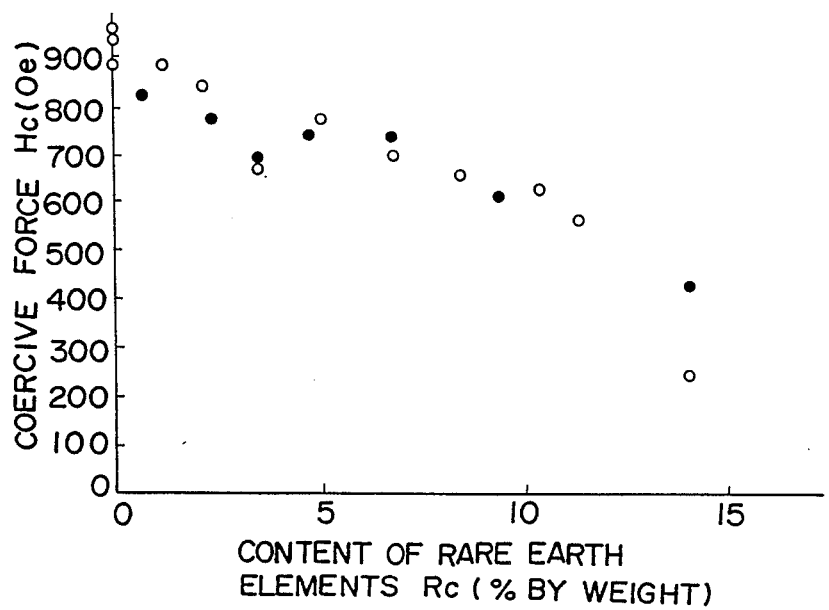
Figure 9:
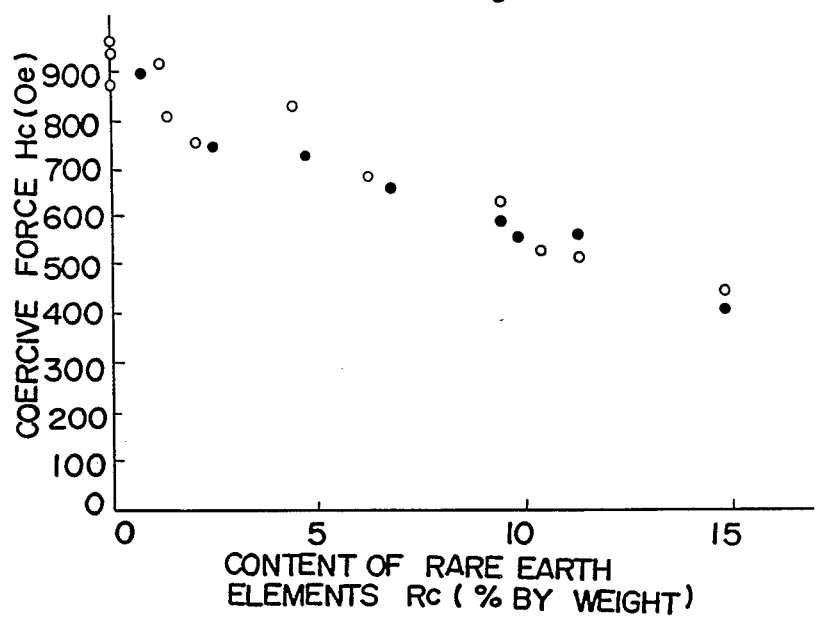
Figure 10:
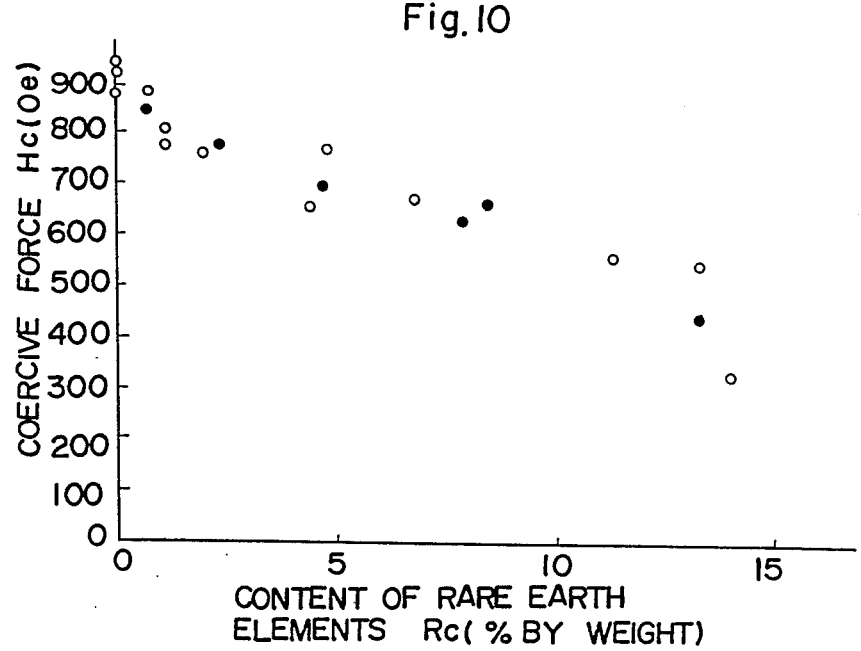
Figure 11:
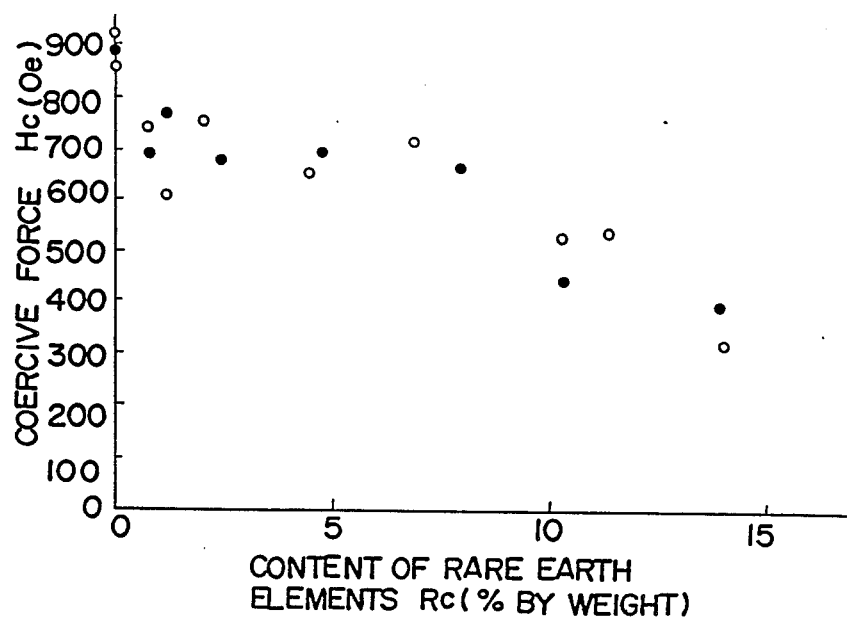

| | Symbol | Co (wt %) | Ni (wt %) | M (wt %) | R (wt %) | O (wt %) |
|---|---|---|---|---|---|---|
| FIG. 7 | | Balance | 11.0 | Nb = 2.0 | (Nd:Gd = 4:5) = Rc | 8.0 |
| | | " | 10.0 | Zr = 3.0 | (Sm:Tb = 3:2) = Rc | 8.0 |
| FIG. 8 | | " | 12.6 | Si = 2.2, Cr = 2.6 | (Nd:Dy = 3:2) = Rc | 6.0 |
| | | " | 12.2 | Ge = 1.1, Nb = 0.9 | (Nd:Gd = 4:5) = Rc | 8.5 |
| FIG. 9 | | " | 11.0 | Cu = 2.0 | (Nd:Gd = 2:1) = Rc | 9.2 |
| | | " | 9.5 | Cu = 1.0, Nb = 1.5 | (Pr:Nd = 4:1) = Rc | 5.8 |
| FIG. 10 | | " | 11.0 | Cu = 2.0 | (Nd:Gd = 2:1) = Rc | 9.0 |
| | | " | 10.0 | Cu = 3.0 | (Sm:Tb = 3:2) = Rc | 8.0 |
| FIG. 11 | | " | 10.8 | Si = 1.2, Cr = 2.2 | (Nd:Dy = 5:2) = Rc | 10.8 |
| | | " | 9.5 | Ge = 1.0, Nd = 1.1 | (Pr:Nd = 7:2) = Rc | 9.8 |

As apparent from the foregoings, this invention can provide those which are excellent in the magnetic properties and the corrosion resistance as compared with conventional Co—Ni series magnetic recording media.

We claim:

1. A magnetic recording medium comprising a nonmagnetic substrate and a crystalline magnetic layer formed on said substrate, said crystalline magnetic layer comprising, on a weight basis, 1–8% of one or more metal elements M selected from the group consisting of B, Al, Si, P, Ge, Sn, Sb, Se, Te, Pb, Bi, Cu, Ti, V, Cr, Zr, Nb, Mo, W and Ta, between 0.4 and 13% of at least one rare earth element selected from the group consisting of La, Ce, Pr, Nd, Sm, Gd, and Dy, 3–13% of oxygen, and a balance of Co and inevitable impurities.

2. A magnetic recording medium as defined in claim 1, wherein the magnetic layer further contains between 2.8 and 22% by weight Ni.

3. A magnetic recording medium as defined in claim 1, wherein the inevitable impurities are less than 1% by weight of one or more elements selected from the group consisting of C, S, Zn and Fe.

4. A magnetic recording medium as defined in claim 1, wherein the magnetic layer has a thickness of 0.1 μm–1.0 μm.

5. A magnetic recording medium as defined in claim 1, wherein the non-magnetic substrate is glass.

6. A magnetic recording medium as defined in claim 1, wherein the non-magnetic substrate is made of Al.

7. A magnetic recording medium as defined in claim 1, wherein the magnetic layer is formed by a sputtering method, an ion plating method or a vacuum deposition method.

8. A magnetic recording medium as defined in claim 1, wherein the non-magnetic substrate is subjected to a primary treatment of corona discharging treatment before the magnetic layer deposition thereon.

9. A magnetic recording medium as defined in claim 1, wherein the non-magnetic substrate is flexible, stretch resistant, and has a thickness of 5–25 μm.

10. A magnetic recording medium as defined in claim 9, wherein the non-magnetic substrate is composed of a polymer selected from the group consisting of polyester, acetate, polycarbonate and polyimide.

* * * * *